United States Patent [19]

MacGregor

[11] Patent Number: 5,799,439
[45] Date of Patent: Sep. 1, 1998

[54] PROTECTIVE ENCLOSURES FOR SEEDS

[75] Inventor: Alasdair MacGregor, London, United Kingdom

[73] Assignee: Desert Bloom Foundation, Perth, Scotland

[21] Appl. No.: 765,834

[22] PCT Filed: Jul. 10, 1995

[86] PCT No.: PCT/GB95/01621

§ 371 Date: Jan. 10, 1997

§ 102(e) Date: Jan. 10, 1997

[87] PCT Pub. No.: WO96/01553

PCT Pub. Date: Jan. 25, 1996

[30] Foreign Application Priority Data

Jul. 12, 1994 [GB] United Kingdom ............ 9413984

[51] Int. Cl.[6] .................. C01C 1/06; A01B 79/00; A01G 23/02; A01G 1/00
[52] U.S. Cl. ............... 47/57.6; 47/58; 47/73; 47/74; 47/77; 47/DIG. 9; 47/DIG. 4; 424/456; 424/473; 424/478; 435/177; 435/180; 800/200
[58] Field of Search ........... 47/57.6, 58, DIG. 11, 47/DIG. 9, 73, 74, 77; 424/456, 473; 435/240.22; 800/200

[56] References Cited

U.S. PATENT DOCUMENTS

| 4,645,698 | 2/1987 | Matsubara | 428/68 |
| 4,908,315 | 3/1990 | Kertz | 435/240.4 |
| 5,250,082 | 10/1993 | Teng et al. | 47/57.6 |

FOREIGN PATENT DOCUMENTS

| 0 017 193 A1 | 10/1980 | European Pat. Off. |
| 0 115 956 A1 | 8/1984 | European Pat. Off. |
| 1085-538-A | 1/1985 | U.S.S.R. |
| 1577-715-A | 7/1991 | U.S.S.R. |
| 927029 | 12/1991 | United Kingdom |
| WO 84/04651 | 12/1984 | WIPO |
| WO 87/03167 | 6/1987 | WIPO |
| WO 91/05459 | 5/1991 | WIPO |
| WO 91/14466 | 10/1991 | WIPO |
| WO 94/00975 | 1/1994 | WIPO |

*Primary Examiner*—Robert A. Wax
*Assistant Examiner*—Tekchand Saidha
*Attorney, Agent, or Firm*—Kinney & Lange, P.A.

[57] ABSTRACT

Protective enclosures for seeds provide a self-contained environment for protecting the seeds in their early growth stages in arid or hostile environments. A protective enclosure (10) for one or more seeds (15) comprising an outer shell (11), said shell (11) being permanently or temporarily liquid-impermeable in at least one direction, and a hygroscopic material (14) contained within the the shell (11) surrounding at least one seed (15), said material (14) being capable of absorbing and storing liquid.

19 Claims, 3 Drawing Sheets

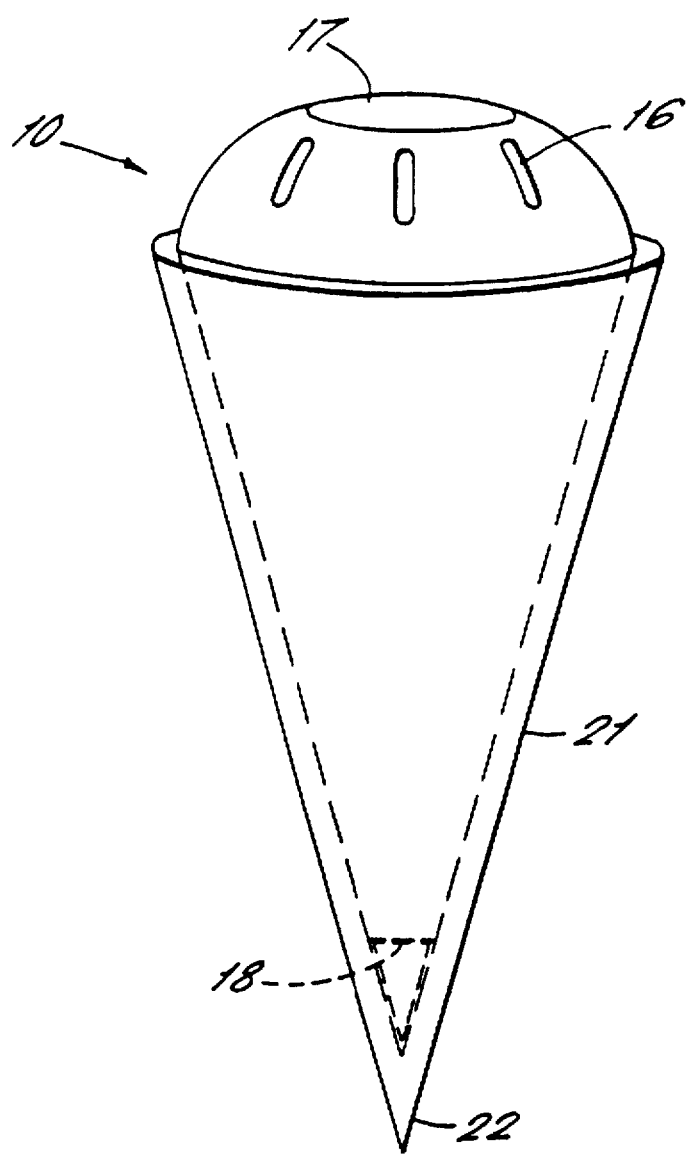

PROTECTIVE ENCLOSURES FOR SEEDS

The invention relates to protective enclosures for seeds, for providing a self-contained environment for protecting the seeds in their early growth stages in arid or hostile environments.

In many countries around the world there has been significant land degradation in arid, semi-arid and dry sub-humid areas resulting from various factors such as climatic variations and human activities. The degradation process, often the product of human pressure on land resources, begins with the loss of natural vegetation cover and results in the nutrient-rich surface layers of the exposed soil being washed away. The remaining soils are nutrient deficient, becoming compacted with a much reduced water holding capacity.

Plant re-seeding and establishment is extremely difficult in such vulnerable soils, but is vital in staving off the increase of famine in such areas. The replacement of ground cover with shrubs and grasses as well as trees will serve to bind and stablise vulnerable soils, thus benefiting both soil and water conservation schemes. Local people will in the long term thus benefit from increase in food, water, fuel and shelter.

Conventionally, it has been possible to irrigate large tracks of land by diverting or damming main river systems using intrusive engineering work. Environmentalists have expressed serious reservations, however, over the negative impact of such schemes on local and downstream ecosystems and human populations. Many development organisations now utilise microdams to provide a water conservation mechanism which limits any negative environmental impact. However, the cost of such systems is extremely high.

In desertified regions, the sparsity of vegetation cover in dam catchment areas is leading to severe siltation problems due to soil erosion, which also threatens the efficiency of the essential irrigation schemes.

Another solution is to provide underground perforated irrigation pipes, but the expense of this is prohibitive in many areas which require irrigation badly.

Other schemes have been attempted, whereby a super-absorbent material has been ploughed into topsoil and mixed therewith to permit cultivation of plants by increasing the water-holding capacity of the soil. This was a development from known domestic uses of water holding gels. The lack of protection from the sun, however, leads to evaporation in low humidity atmospheric conditions and possible damage to the seeds. These schemes are only really successful where there is a substantial regular water supply, although they are of benefit in extending the interval between irrigation treatments.

It is accepted that irrigation and fertilisation of newly planted plants can have dramatic effects on root growth.

The invention therefore aims to solve the problems of successfully ensuring plant growth in arid regions by providing seeds with protective enclosures, which provide a micro-environment for survival and growth in hostile conditions, which is inexpensive to manufacture and which has the flexibility to facilitate distribution by a wide number of methods.

According to the invention there is provided a protective enclosure for one or more seeds comprising an outer shell, said shell being liquid-impermeable in at least one direction, and an hydrophilic absorbent material contained within the shell surrounding at least one seed, said absorbent material being capable of absorbing and storing liquid.

There will now be described, by way of example only, preferred embodiments of the invention with reference to the accompanying drawings in which:

FIG. 1a shows a cross-sectional plan view of the seed enclosure of FIG. 1 on the line 1a—1a;

FIG. 4 is a side elevation of a further alternative embodiment of a seed enclosure according to the invention.

Figure 1:
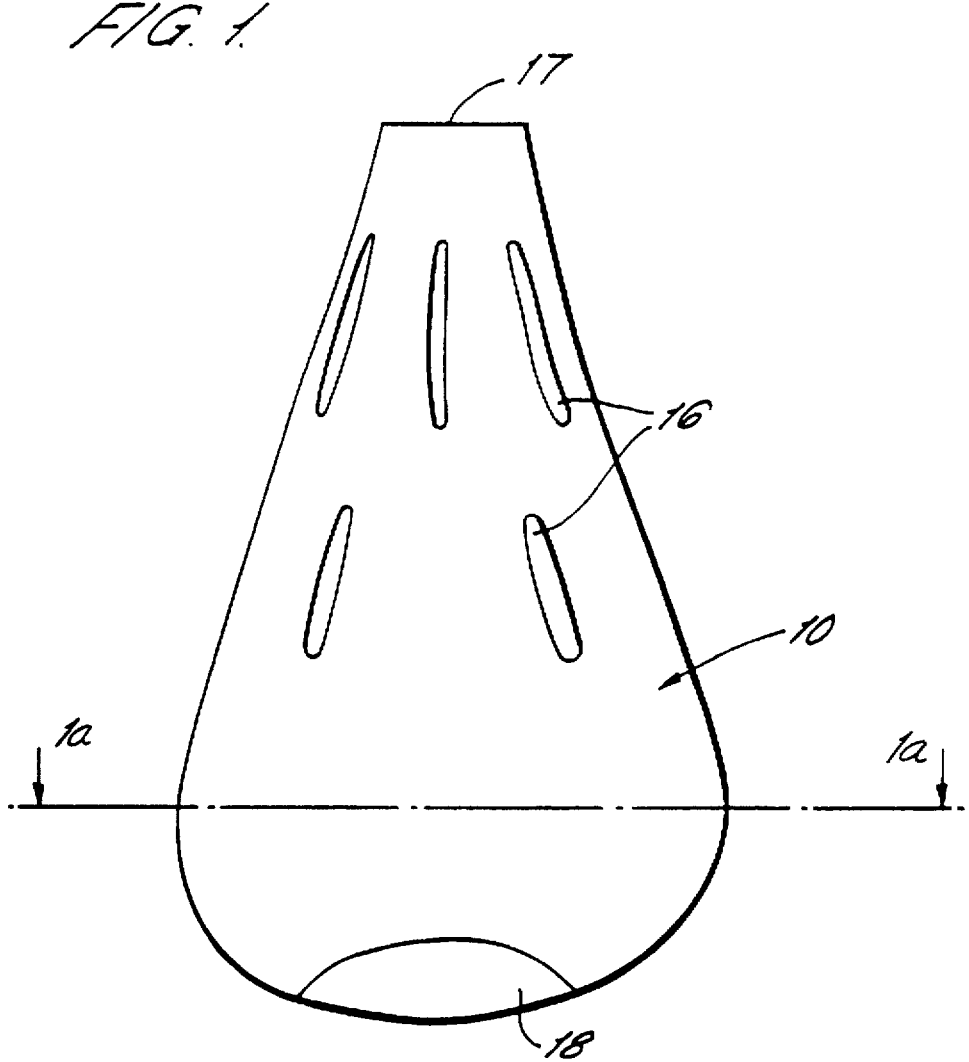
FIG. 1 shows a front elevation of a seed enclosure according to the invention.
Figure 1A:
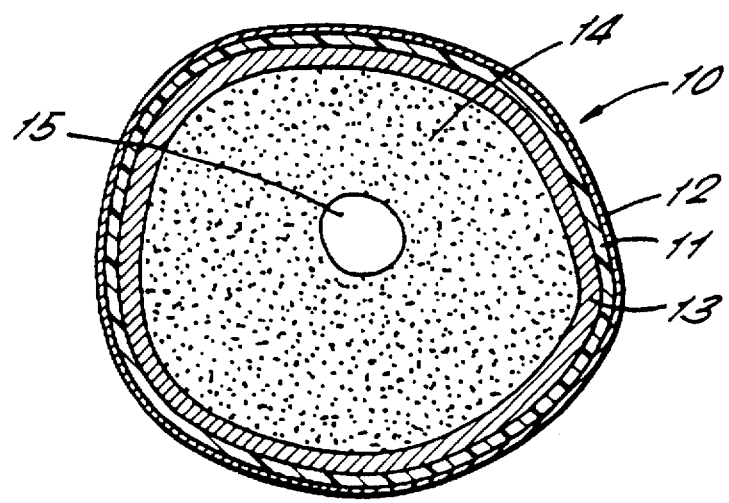

Referring to FIGS. 1 and 1a there is shown a seed enclosure 10. As can be seen from FIG. 1a, the seed enclosure 10 comprises a shell 11, preferably made from a polymer such as polyurethane, a film material or from a gelatinous material. The shell 11 may be in the form of a membrane which is water or liquid-permeable in one direction only. In other words it allows the absorption of outside ground rain water until the contents of the enclosure 10 are hydrated, but prevents evaporation once the ground environment returns to a dry and hot state. Alternatively, the shell 11 may be an impermeable membrane which has small openings 16 or overlapping flaps. The shell 11 is preferably coated with a reflective coat 12 and lined with an inner skin 13 which acts as a filter. If the shell 11 is liquid-permeable, then so is the coat 12.

There may also be included in shell 11 slits or openings 16. These are of a structure such that as the shell 11 expands the opening 16 close and as the shell slackens and returns to its non-expanded state the opening 16 slacken and re-open. The opening 16 may be measured or cross slit designed into the shell 11 such that they are not tightly fitted or closed in the relaxed state but which move to close into an exact fit or into an overlapped position in a shell's expanded state. When in the closed state, the shell 11 may be provided with a water activated sealant which would assist in fastening and sealing the opening 16. The openings 16 may also be formed with flaps which are closable to seal the opening 16 and may be slackened to reveal the opening 16.

The enclosure 10 is packed with a hygroscopic material 14. The material 14 may be a simple, super or a mixed absorbent, but is preferably a super-absorbent polymer in the form of water-insoluble hydrogels or hydrocrystals which surround one or more seeds 15. The material 14 must be capable of absorbing and storing large amounts of water. Examples of super-absorbent polymers are Broadleaf P4 (Trade Mark), SANWET IM-300 and IM-1000 (Trade Mark), AQUASTORE (Trade Mark), AGRIGEL (Trade Mark), GROWSOAK 400 (Trade Mark) and ALGINURE SOIL CONDITIONER (Trade Mark). These are all cross-linked polyacrylamide polymers except for ALGINURE which is a seaweed based product. The combination of the shell 11 and absorbent material 14 help to minimise the loss of water from the enclosure 10 through evaporation.

The enclosure 10 may also contain nutrients, growth promotion substances, protection chemicals or substances, pesticides, aerating sponge filler and anything else which would aid the survival or promote the germination and growth of the seed 15.

The sponge filler also helps to bind and hold the hydrated absorbent material 14 in the shell 11. The sponge also provides a wick to transfer the absorbed water quickly throughout the material 14 so that it reaches the seed(s), nutrients, chemical substances etc. mixed with the material 14. This prevents the problem of gel blocking which can occur when super-absorbent hydrogels are first wetted. The sponge filler may be replaced by any other suitable substance. Peat moss has been known to be successful in acting as a wicking agent to prevent gel blocking.

The seed enclosures 10, when sown, provide the means to supply the seed, and subsequently the seedling, with moisture primarily to sustain it at least through the most critical first weeks of germination growth, in areas where the soil environment is arid, thereby ensuring the plant the best chance of establishment. In simple absorbent materials, the retained water is stored in interstitial locations, whereas in super-absorbent polymers the water is trapped within the polymer network as minute micro-reservoir droplets thus forming a gel-like consistency surrounding the seeds 15 within the enclosure 10. This allows the seed 15 and subsequently the roots of the seedlings after germination to draw water therefrom for a sufficient length of time to ensure healthy germination and rooting of individual plant seedlings. Because of the method of trapping water, the seeds and roots are not waterlogged and the roots can grow right through the gel particles.

When water is available externally from infrequent rains or human irrigation, it is absorbed either directly through the shell 11 itself or through the openings 16 in the shell and stored in the absorbent material 14. In the embodiment of the invention incorporating the impermeable shell 11, once the absorbent material 14 is hydrated it swells up and causes the openings 16 or flaps to close and reseal to prevent any evaporation or loss of the trapped moisture. When the internal water supply has been utilised and the absorbent material 14 is dehydrated, the flaps or openings 16 slacken or re-open. This means that the enclosure 10 can take advantage of sporadic rains to ensure that the material 14 is well hydrated. Once the rains stop and the ground/soil dries up, the germinating seedling can then draw up the moisture contained by the material 14.

As the absorbent material 14 swells, the particles thereof open up and help to aerate the enclosure 10, which aids root growth.

The amount of material 14 packed inside the enclosure 10 and the absorbency of the material 14 can be selected to ensure that the seed 15 has the best chance of survival in the environment where it is planted. The time period can be selected from 3 to 12 weeks or even more, depending on the frequency of the sporadic rain or irrigation and the rate at which the seed/seedling utilises the water.

Some super-absorbent polymers which are currently available such as SANWET 1000, are able to hydrate to approximately 1000 times their weight in deionised water, although this figure is significantly less in irrigation water. The difference in absorbency rates is due to impurities, such as calcium carbonate, in irrigation water.

It is envisaged that, in the future, ultra-super-absorbent materials will also be developed which hydrate at much greater rates. Obviously, as the absorbency of such materials improve, there will be a proportional increase in the period of usefulness of the enclosures 10 of the present invention.

As mentioned previously, an inner skin 13 in the enclosure 10 can act as a water filter. This will assist in increasing the purity of water hydrating the polymer 14 and thereby to reduce the difference in water retention capacity mentioned previously.

The materials of the enclosure 10 are preferably biodegradable so that, in time, the enclosure 10 itself will cease to exist. The materials are preferably selected to have a rate of biodegradability such that the enclosure 10 ceases to exist when the young plant is firmly established and the roots have grown down to reach enough underground moisture to sustain growth of the plant to establishment stage. The time taken for this to happen will obviously vary according to the type of seed used and its rate of germination and growth.

As more plants become established the water holding capacity of the soil will improve and the level of siltation will decrease. After a period of time, when a protective layer of vegetation has been established and the soil quality has improved, the seed enclosures 10 will no longer be required, and seeds can be sown in the usual way.

One variation of the enclosure 10 has a thin wall 17 at an upper end which can easily be penetrated to allow shoots to emerge and a thin wall 18 at the lower end to allow roots to emerge and grow into the soil. Alternatively the walls 17 and 18 may incorporate flaps which overlap to prevent the evaporation of the contained water, but which can be pushed apart to allow emergence of the shoots and roots. In another embodiment of the invention, the walls 17 and 18 are of a material which biodegrades at a faster rate than the rest of the enclosure 10, to allow shoot/root emergence.

The lower end of the enclosure 10 may be thicker and weighted so that when sown the lower end remains downwards. If sown in already wet and muddy soil, the weighting may allow partial embedding of the enclosure 10 in the soil.

The shell 11 must either be elastic to allow for expansion of the material 14 as it absorbs the liquid or sufficient space must be left in the enclosure 10 to allow for the expansion. A convenient way of doing this is to use the sponges mentioned previously.

Figure 2:
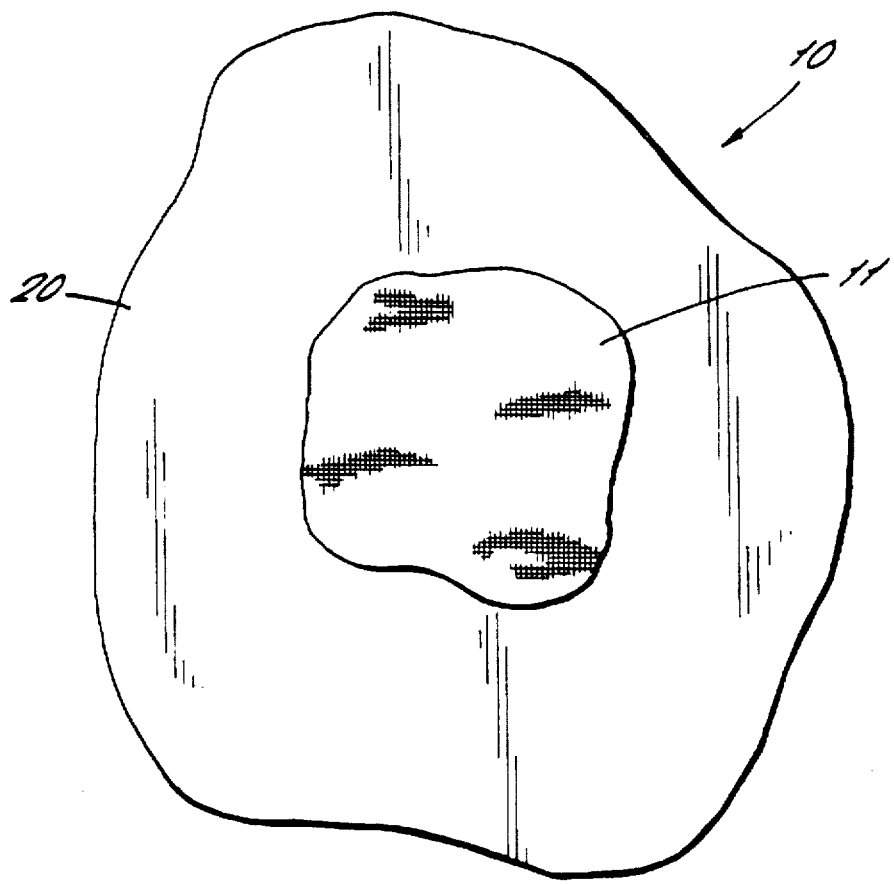
FIG. 2 shows a plan view of an alternative seed enclosure according to the invention.
Figure 3:
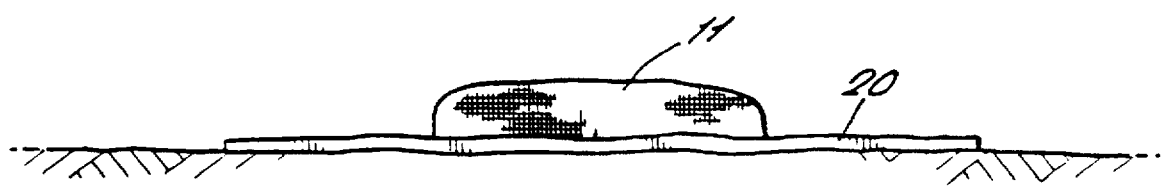
FIG. 3 is a side elevation of the seed enclosure of FIG. 2.

FIG. 2 shows an alternative enclosure 10. This enclosure 10 has a flexible shading flap 20 which lies on the surface of the ground to give an area of shade where the roots are growing. The shade helps to cool the soil and reduce the evaporation rate. The shell 11 of this embodiment of the invention has a gauze structure which comprises a multitude of tiny holes which expand during the hydration process to take account of the expansion of the absorbent material 14.

In order to prevent evaporation of the absorbed water, a water reacting slow agent could form to harden as the rains dry out so that resultant sealant combined with a gauze shell becomes impermeable.

In the embodiment of the enclosure 10 shown in FIG. 4, the enclosure 10 is placed in a cone 21. This cone 21 has a pointed, weighted and toughened lower end 22 which enables it to penetrate the soil when it is sown, possibly by 6 to 9 inches. The cone 21 may be attached to the enclosure 10 by appropriate means, such as a synthetic non-toxic adhesive substance which dissolves in water. Once the soil softens due to the impact of rain water, the air in the enclosure 10 would cause it to buoyantly float upwards and rise to or near the surface where it behaves similarly to the enclosure 10 illustrated in FIGS. 1 and 1A.

The enclosures 10 can be sown manually or using ground vehicles. These vehicles may plough the dry or degraded earth and lay the seeds on or in the resulting furrows. Alternatively they may be distributed from an aircraft and dropped on the ground. If the enclosures 10 are sown on dry land, it is preferable that, immediately after sowing, water is administered to hydrate the enclosures 10. This may be achieved by the sowing vehicle itself or any other appropriate method such as a follow on water tanker with sensors to note the spacings positions of the enclosures 10 such that measured amounts of clean acquifier in situ pumped water may be sprayed from nozzles in, say, an inverted trough in the chassis beneath the tankers.

In another embodiment, it is envisaged that the enclosures 10 could be made in pipe form with the seeds and other relevant ingredients mixed inside. These pipes can be stored in reels and unreeled in fields followed by water applying equipment.

Polymer film coatings may be used on the enclosures 10 which react to various stimuli such as light, temperature and water to cause chemical electrolyte movements of the material allowing for the openings 16 to open or close, whilst in a static or expanding state.

Such smart materials can be used to bond or contract with other materials within the enclosure 10, so causing maximum absorption with minimum evaporation whilst still allowing for proper filtration of dirty ground water to enhance the hydrating quality of the absorbent material 14.

In yet another embodiment of the invention, the enclosure 10 may be constructed so that it has numerous filaments or other protrusions to act in such a way as to help trap morning dew for absorption and/or to help anchor the enclosure 10 itself with the help of water (or other such stimuli) activated sticky substance.

In addition to the cable reel system envisaged for long strands of "pipes" of the enclosures 10, one way of assisting randomly or regularly distributed enclosures 10 to remain in position during rain storms (rather than being washed en mass into wadis or culverts etc.) would be to build revetments of long lengths of different diameter sized pipes, complimented by lots of short barriers to help impede the rapid flow of top soil water, thereby allowing the ground to stay soaked for longer periods.

The internal structure of the enclosure 10 may be made in a honey-comb format which concertinas flat to allow for packaging. This structure enhances the prevention of water evaporation from the enclosures 10 and improves the integrity of the internal structure.

I claim:

1. A protective enclosure for at least one seed comprising an outer shell, said shell being at least temporarily liquid-permeable so as to allow the ingress of liquid and being at least temporarily liquid-impermeable to prevent the egress of moisture, the shell having an inner skin, which acts as a filter, and a hygroscopic material contained within the shell surrounding at least one seed, said material being capable of absorbing and storing liquid.

2. A protective enclosure for at least one seed as claimed in claim 1 in which the hygroscopic material is a polymer material.

3. A protective enclosure for at least one seed as claimed in claim 1 in which the hygroscopic material is a super-absorbent material.

4. A protective enclosure for at least on seed as claimed in claim 1 in which the shell has a reflective coat.

5. A protective enclosure for at least one seed as claimed in claim 1 in which the shell has a plurality of openings which open to allow the ingress of liquid, but which close up when the hygroscopic material is hydrated.

6. A protective enclosure for at least one seed as claimed in claim 5 in which the openings comprise overlapping flaps.

7. A protective enclosure for at least one seed as claimed in claim 1 in which the shell has at least one area which is thin to allow the emergence of shoots and/or roots.

8. A protective enclosure for at least on as claimed in claim 1 in which the enclosure is further defined as containing a wicking material.

9. A protective enclosure for a least one seed as claimed in claim 1 in which the enclosure is further defined as containing an aerating material.

10. A protective enclosure for at least one seed as claimed in claim 1 in which the shell is further defined as containing at least one substance from the group consisting of nutrients, growth promoting substances, protection chemicals and pesticides.

11. A protective enclosure for at least one seed as claimed in claim 1 in which the materials of the enclosure are biodegradable.

12. A protective enclosure for at least one seed as claimed in claim 11 in which at least one area of the enclosure biodegrades at a rate faster than that of the rest of the enclosure.

13. A protective enclosure for at least one seed as claimed in claim 1 in which the enclosure is further defined as containing a shading flap.

14. A protective enclosure for at least one seed as claimed in claim 1 in which the shell of the enclosure is further defined as having a gauze-like structure.

15. A protective enclosure for at least one seed as claimed in claim 1 in which the enclosure is placed in a cone, said cone having a pointed, weighted and toughened end.

16. A protective enclosure or at least one seed as claimed in claim 1 in which an end of the enclosure is weighted.

17. A protective enclosure for at least one seed as claimed in claim 1 in which there are a plurality of individual enclosures joined together.

18. A protective enclosure for at least one seed as claimed in claim 1 in which the enclosure is further defined as having a long thin tube-like appearance.

19. A protective enclosure for at least one seed as claimed in claim 1 in which the shell has at least one area which is provided with an opening to allow the emergence of shoots and/or roots.

* * * * *

UNITED STATES PATENT AND TRADEMARK OFFICE
CERTIFICATE OF CORRECTION

PATENT NO. : 5,799,439
DATED : SEPTEMBER 1, 1998
INVENTOR(S) : ALASDAIR MACGREGOR

It is certified that error appears in the above-identified patent and that said Letters Patent is hereby corrected as shown below:

Col. 5, line 44, delete "on", insert --one--

Col. 6, line 8, delete "on", insert --one seed--

Signed and Sealed this

Sixteenth Day of November, 1999

Attest:

Q. TODD DICKINSON

Attesting Officer   Acting Commissioner of Patents and Trademarks